United States Patent

Dosoudil

[11] Patent Number: 4,637,876
[45] Date of Patent: Jan. 20, 1987

[54] DISC SHAPED FILTER ELEMENT

[76] Inventor: Martin Dosoudil, Kwakelkade 28, Alkmaar, Netherlands

[21] Appl. No.: 700,367

[22] Filed: Feb. 11, 1985

[30] Foreign Application Priority Data

Mar. 1, 1984 [NL] Netherlands ............... 8400662

[51] Int. Cl.⁴ .............................. B01D 33/28
[52] U.S. Cl. ................... 210/331; 210/346; 210/486
[58] Field of Search ............... 210/325, 331, 345, 346, 210/347, 483, 486, 322, 323.1, 488

[56] References Cited

U.S. PATENT DOCUMENTS

| | | | |
|---|---|---|---|
| 2,061,351 | 11/1936 | Denhard | 210/486 |
| 2,639,251 | 5/1953 | Kracklauer | 210/486 |
| 3,019,905 | 2/1962 | Baker et al. | 210/331 |
| 3,291,312 | 12/1966 | Peterson | 210/486 |
| 3,486,627 | 12/1969 | Ashby et al. | 210/486 |
| 3,537,592 | 7/1968 | Ogden | 210/486 |
| 3,581,902 | 6/1971 | Bidler | 210/486 |
| 3,702,659 | 11/1972 | Clark | 210/486 |
| 4,221,663 | 9/1980 | Little | 210/345 |

Primary Examiner—Ivars Cintins
Assistant Examiner—Wanda L. Millard
Attorney, Agent, or Firm—Pollock, VandeSande and Priddy

[57] ABSTRACT

Disc-shaped filter element with a hollow boss member through which the filtrate is to be discharged, and which filter element is divided into sectors by means of radially extending flexible sealing members, along with sealing members and along the periphery of the element U shaped channels are formed, while each sector communicates with the boss member by means of filtrate outflow pipes extending along the radial sealing members and protuding into the boss member.

10 Claims, 5 Drawing Figures

DISC SHAPED FILTER ELEMENT

The present invention relates to a disc-shaped filter element, consisting of a hollow boss-member for the discharge of the filtrate, said boss-member carrying a flat disc-shaped supporting member or supporting wiring which on both sides is covered by filter gauze, sealed along the periphery of the element and to the boss-member, the filter element being divided by radially extending sealing members into a plurality of sectors, e.g. three sectors, communicating with the space in the boss-member by means of filtrate-outflow-pipes protruding into the space of the boss-member.

Such a disc-shaped filter element is in itself known in the prior art.

This known filter element is used in a rotation or continuous filtering apparatus in which the filter element rotating about an axis of rotation is directed through a bath of the liquid to be filtered during which the filtrate is directed to the inside of the filter element to be discharged therefrom to the inside of the boss-member.

When leaving the liquid bath the filtrate in the sectors of the element is poured in succession through the respective downwardly directed outflow-pipes into the space in the inside of the boss-member to be discharged therefrom through the channel formed by the joint boss-members situated in abutting relationship upon the shaft of rotation carrying the filter elements.

The filtrate in the boss-member can flow through those outflow-pipes and into the respective sectors, only to the extent that these outflow-pipes remain underneath the liquid level in the boss-member.

In this known filter element, the sealing members radially extending between both filter faces of the filter element are made up as rigid spokes to which the filter gauze is fastened.

This construction has the disadvantage that the movability of the filter gauze is low, which hinders the removal of the filter-cake from the gauze by the conventional blow-back.

Also the gauze is weakened along the rigid sealing members due to the considerable forces arising during each blow-back so that, in the long run, it will be torn free from the sealing members.

It is an object of the present invention to obviate these disadvantages of the known filter element.

According to the present invention the filter element described above is modified to form the radial sealing members of a flexible material, more particularly rubber, which includes lips that are fastened to the filter gauze and partly impregnate the same.

By using flexible sealing members an increased movability of the filter gauze is obtained, so that upon occurrence a blow-back to remove the filter-cake from the gauze, the gauze may easily deform causing the cake to break loose from the gauze.

The attaching lips of the radial sealing members extend, according to a feature of the filter element of the present invention, in opposite directions, and as a result the movability of the filter gauze faces of the filter element is further increased.

In a preferred embodiment of the filter element of the present invention, a cross section of a radial sealing member comprises a web portion at which extends radially between both filter gauze faces and which has adjoining strip-shaped lips that give the cross section an —H- form, two of the diametrically opposed lips being attached to the filter gauze faces while the other two lips lie loosely against the filter gauze, so, that on both sides of the radial sealing member a U-shaped channel is formed the open side of which is directed to the inside of the adjoining sector of the filter element.

In the preferred embodiment of the invention, the sealing member that extends along the outer periphery of the filter element is provided at its inner side with a similar U-shaped channek, whichis interrupted at its intersections with the radial sealing members to adjoin the U-shaped channels that are formed along the sides of the radial sealing members.

Accordingly, in the preferred embodiment of the invention, a U-shaped channel is present along the periphery of each sector of the filter element, the open side of said channel being directed to the inside of the sector, so that any channel filtrate residue remaining in a sector may be collected in the peripheral channel of that sector and then discharged from the channel through the filtrate-outflow-pipes into the hollow boss-member of the filter element.

An embodiment of the invention will now be described by way of example with reference to the accompanying drawings in which.

Figure 1:
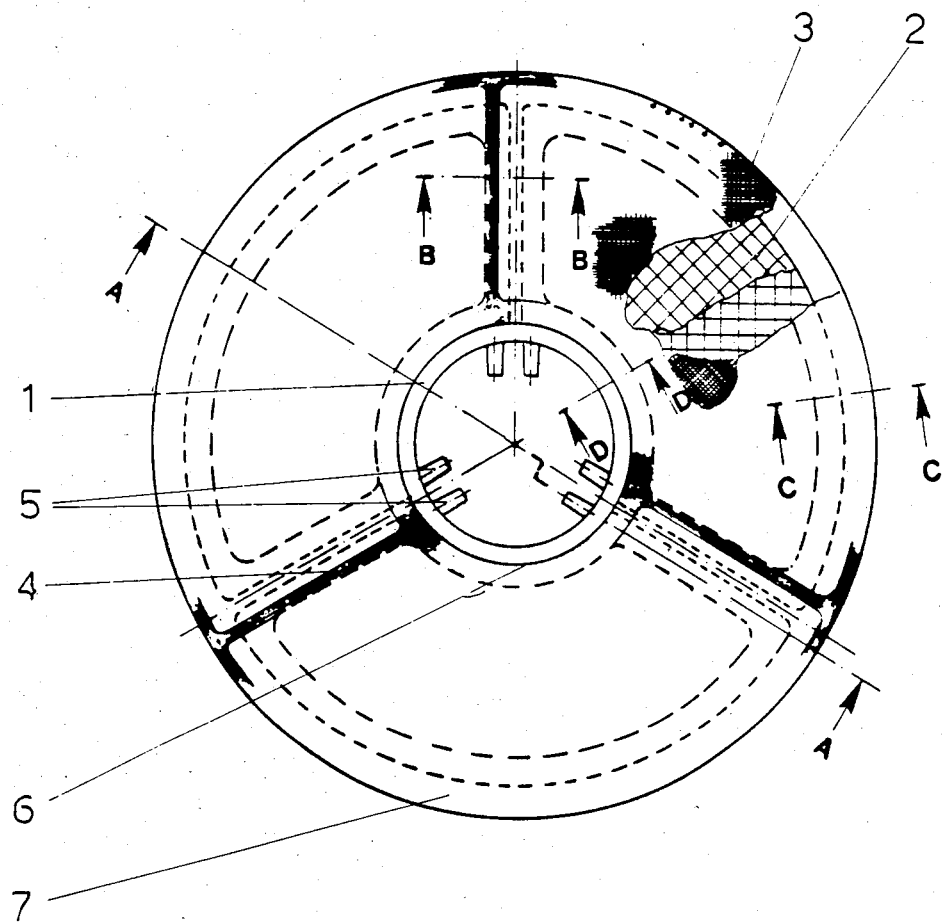
FIG. 1 is a side view of the filter element according to the invention.
Figure 2:
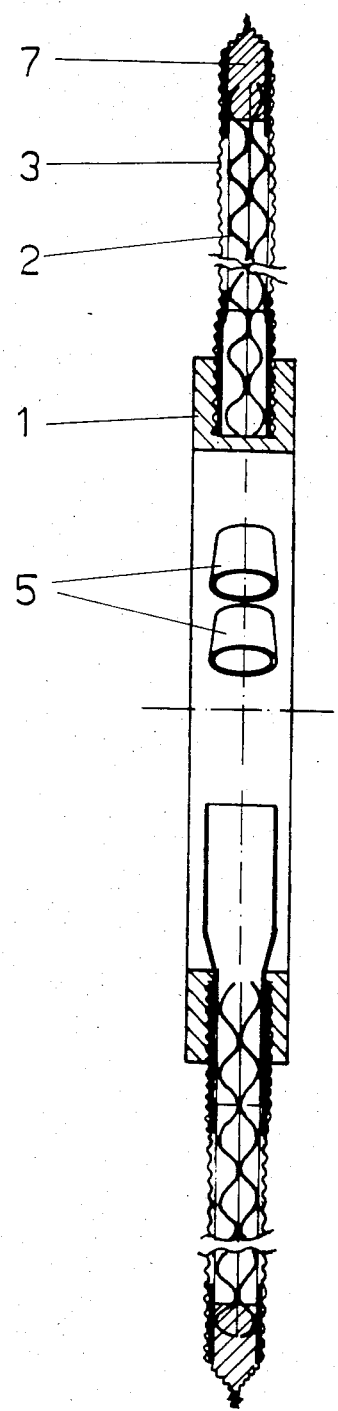
FIG. 2 is a section taken on line A—A of FIG. 1.
Figure 3:
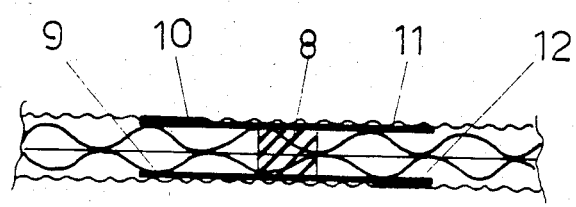
FIGS. 3, 4 and 5 are sections taken respectively on lines B—B, C—C, and D—D of FIG. 1.

As is shown in the drawing, the disc-shaped filter element consists of a hollow boss-member 1, intended for the discharge of the filtrate, onto which a disc-shaped supporting wiring 2 is mounted, both sides of which are covered by filter gauze 3. The element is divided by three radially extending sealing members 4 into three sectors, which are connected to boss-member 1 by means of filtrate-outflow-pipes 5 extending along both sides of the sealing members 4 and protruding into the hollow boss-member 1.

Figure 4:
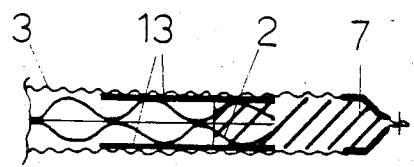
Figure 5:
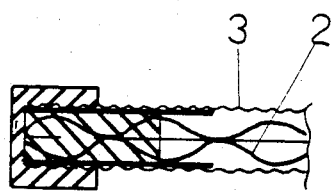

Rubber seals 6 and 7 are provided respectively along the periphery of the boss-member as well as the outer periphery of the filter element and the rubber seals 6 and 7 completely fill the space in the supporting wiring 2 and between both filter gauze faces 3, as is shown in FIG. 4 and FIG. 5.

The radially extending sealing members 4 each are formed by a web porton 8 extending between both filter gauze faces 3 and are provided with adjoining strip-shaped lips 9, 10, 11 and 12 which give the sealing member an —H— form in cross-section. The diametrically opposing lips 10 and 12 are fastened to the filter gauze 3, thereby filling up the adjacent interstices of the gauze, while the other diametrically opposing lips 9 and 11 lie freely against the filter gauze 3 and forming with the lips 10 and 12 a U-shaped channel.

As is shown in FIG. 1 and FIG. 4, the sealing 7 along the outer periphery of the disc-shaped filter element is also provided with lips 13 which lie freely against the filter gauze 3, to form another U-shaped channel which is interrupted at the radially extending sealing members 4 to adjoin the U-shaped channels on both sides of members 4. By using U-shaped channels on both sides of each radial sealing member and along the outer periphery of the filter element in combination with the filtrate-outflow-pipes 5 that communicate with the radial U-shaped channels it is achieved that, when the filter-cake is blown dry, the filtrate remainders will be collected into the channels to be discharged therefrom through the outflow-pipes 5 into the inside of the boss-member 1 of the filter element.

I claim:

1. A disc-shaped filter element comprising a pair of generally planar disc-shaped filter members disposed in spaced generally parallel relation to one another, annular sealing means located between and attached to the outer peripheries of said disc-shaped filter members, a hollow boss-member through which filtrate is to be discharged, said boss member being coaxial with said annular seal member and being attached to each of said filter members adjacent the center of said disc-shaped filter element, a plurality of radial sealing members attached to each of said filter members and extending from said hollow boss member to said annular sealing member between said filter members for subdividing the interior of said filter element into a plurality of separate sectors, and a plurality of conduits which extend from said sectors respectively through said boss member to effect fluid-flow communication between each of said sectors and the interior of said hollow boss member, each of said radial sealing members comprising an elongated web of flexible material which extends across the space between said pair of filter members, said elongated web being provided with lips of said flexible material that extend outwardly of said web in opposite directions relative to the direction of elongation of said web and generally parallel to the planes of said filter members, said lips being attached to each of said filter members with the flexible material of said lips penetrating those portions of said filter members which are adjacent to said lips, a first pair of said lips extending outwardly of said web in said opposite directions adjacent one of said disc-shaped filter members, and a second pair of said lips extending outwardly of said web in said opposite directions adjacent the other of said disc-shaped filter members, one of the lips in each of said first and second pairs of lips being attached to its respective adjacent filter member, and the other lip in each of said first and second pairs of lips lying loosely against the surface of its respective adjacent filter member.

2. The filter element of claim 1 wherein said lips define a radially extending channel along each side of each of said radial sealing members, each of said radially extending channels having an open mouth which faces the interior of one of said sectors, said annular sealing member defining a further channel about the periphery of said filter element, said further channel having an open mouth which faces the interior of each of said sectors and which is interrupted at the intersections between said radial sealing members and said annular sealing means to effect communication between said further channel and each of said radially extending channels.

3. The filter element of claim 2 wherein said conduits comprise tubular members which extend from said radially extending channels through said boss member to the hollow interior of said boss member.

4. A disc-shaped filter element comprising an annular sealing member, a hollow boss member located within and in concentric relation to said annular sealing member, a plurality of radial sealing members extending between said boss-member and said annular sealing member, a pair of disc-shaped filter members disposed in spaced parallel relation to one another, one of said filter members being in sealing engagement with first surfaces of said annular sealing member, said boss member, and said radial sealing members, and the other of said filter members being in sealing engagement with second surfaces, spaced from said first surfaces, of said annular sealing member, said boss member, and said radial sealing members, whereby said filter element comprises a plurality of filter sectors each of which is defined between facing portions of said pair of filter members that are respectively in sealing engagement with an adjacent pair of said radial sealing members and in sealing engagement with the portions of said boss member and of said annular sealing member located between said adjacent pair of radial sealing members, the portions of said radial and annular sealing members which face the interior of said sectors being shaped to define a filtrate collecting channel which extends continuously along the radial sealing members and along the portion of said annular sealing members which bound each of said sectors, said filtrate collecting channel being formed by pairs of spaced lips which extend outwardly of said radial and annular sealing members in planes generally parallel to the planes of said disc-shaped filter members, and a plurality of filtrate outflow tubes which extend respectively from the filtrate collecting channel through said boss member for the discharge of filtrate from said sectors to the hollow interior of said boss member.

5. The filter element of claim 4 wherein each of said radial sealing members is fabricated of a flexible material.

6. The filter element of claim 5 wherein said annular sealing member is fabricated of a flexible material.

7. The filter element of claim 4 wherein said lips are fabricated of a flexible material, at least some of said lips being attached to adjacent ones of said filter members to effect the sealing engagement of said filter member to said annular and radial sealing members.

8. A disc-shaped filter element comprising a pair of generally planar disc-shaped filter gauze members disposed in spaced generally parallel relation to one another, a wire support located between said disc-shaped filter gauze members, an annular sealing member located between and attached to the outer peripheries of said disc-shaped filter gauze members, said annular sealing member being fabricated of a flexible material, a hollow boss-member through which filtrate is to be discharged, said boss member being coaxial with said flexible annular sealing member and being attached to each of said filter gauze members adjacent the center of said disc-shaped filter element, a plurality of radial sealing members attached to each of said filter gauze members and extending from said hollow boss member to said annular sealing member between said filter gauze members for subdividing the interior of said filter element into a plurality of separate sectors, and a plurality of conduits which extend from said sectors respectively along said radial sealing members and through said boss member to effect fluid-flow communication between each of said sectors and the interior of said hollow boss member, each of said radial sealing members comprising an elongated web of flexible material which extends across the space between said pair of filter gauze members, said elongated web being provided with lips of said flexible material that extend outwardly of said web in directions generally parallel to the planes of said filt;er gauze members to define a plurality of flexible channels which extend around the peripheries of said sectors, each said channel having an open mouth that faces the interior of an associated one of said sectors, said flexible lips being attached to each of said filter gauze members with the flexible material of said lips penetrating and filling the interstices of said filter gauze members which are adjacent to said lips.

9. The filter element of claim 8 wherein said flexible lips extend outwardly of said flexible web from opposite elongate sides of said web.

10. A disc-shaped filter element comprising an annular sealing member fabricated of a flexible material, a hollow boss-member located within and in concentric relation to said annular flexible sealing member, a plurality of radial sealing members fabricated of a flexible material and extending between said boss-member and said annular sealing member, a pair of disc-shaped filter gauze members disposed in spaced parallel relation to one another, one of said filter gauze members being in sealing engagement with first surfaces of said annular flexible sealing member, said boss member, and said flexible radial sealing members, and the other of said filter gauze members being in sealing engagement with second surfaces, spaced from said first surfaces, of said annular flexible sealing member, said boss member, and said flexible radial sealing members, whereby said filter element comprises a plurality of filter sectors each of which is defined between facing portions of said pair of filter gauze members that are respectively in sealing engagement with an adjacent pair of said flexible radial sealing members and in sealing engagement with the portions of said boss member and of said annular flexible sealing member located between said adjacent pair of radial sealing members, the portions of said flexible radial and annular sealing members which face the interiors of said sectors being shaped to define a filtrate collecting channel which is substantially U-shaped in cross section and extends continuously along the radial sealing members and along the portion of said annular sealing member which bound each of said sectors, and a plurality of filtrate outflow tubes which extend respectively from the filtrate collecting channel through said boss member for the discharge of filtrate from said sectors to the hollow interior of said boss member.

* * * * *